US009738959B2

(12) United States Patent
Cheney et al.

(10) Patent No.: US 9,738,959 B2
(45) Date of Patent: Aug. 22, 2017

(54) NON-MAGNETIC METAL ALLOY COMPOSITIONS AND APPLICATIONS

(71) Applicant: Scoperta, Inc., San Diego, CA (US)

(72) Inventors: Justin Lee Cheney, Encinitas, CA (US); John Hamilton Madok, San Diego, CA (US); Kyle Walter Rafa, Fremont, CA (US)

(73) Assignee: Scoperta, Inc., San Diego, CA (US)

( * ) Notice: Subject to any disclaimer, the term of this patent is extended or adjusted under 35 U.S.C. 154(b) by 767 days.

(21) Appl. No.: 14/051,150

(22) Filed: Oct. 10, 2013

(65) Prior Publication Data

US 2014/0105780 A1    Apr. 17, 2014

Related U.S. Application Data

(60) Provisional application No. 61/712,716, filed on Oct. 11, 2012.

(51) Int. Cl.
*C23C 30/00* (2006.01)
*C22C 29/06* (2006.01)
(Continued)

(52) U.S. Cl.
CPC ............ *C22C 38/58* (2013.01); *B23K 35/004* (2013.01); *B23K 35/308* (2013.01); *C09D 1/00* (2013.01);
(Continued)

(58) Field of Classification Search
CPC ......... C22C 29/00; C22C 29/02; C22C 29/06; C22C 29/062; C22C 29/065; C22C 29/08;
(Continued)

(56) References Cited

U.S. PATENT DOCUMENTS 2,043,952 A    6/1936   Ffield
2,156,306 A    5/1939   Rapatz
(Continued)

FOREIGN PATENT DOCUMENTS

AU    WO 8404760 A1 *  12/1984   ............ B02C 13/28
CA           2774546           1/2015
(Continued)

OTHER PUBLICATIONS

Audouard, et al.: "Corrosion Performance and Field Experience With Super Duplex and Super Austenitic Stainless Steels in FGD Systems", Corrosion 2000; p. 4, table 2.
(Continued)

*Primary Examiner* — Scott Kastler
*Assistant Examiner* — Vanessa Luk
(74) *Attorney, Agent, or Firm* — Knobbe Martens Olson and Bear LLP

(57) ABSTRACT

Disclosed are non-magnetic metal alloy compositions and applications that relate to non-magnetic metal alloys with excellent wear properties for use in dynamic three-body tribological wear environments where an absence of magnetic interference is required. In one aspect, the disclosure can relate to a drilling component for use in directional drilling applications capable of withstanding service abrasion. In a second aspect, a hardbanding for protecting a drilling component for use in directional drilling can be provided. In a third aspect, a method for prolonging service life of a drilling component for use in directional drilling can be provided.

10 Claims, 6 Drawing Sheets

(51) Int. Cl.

| | | |
|---|---|---|
| C22C 29/14 | (2006.01) | |
| C22C 32/00 | (2006.01) | |
| C22C 38/38 | (2006.01) | |
| C22C 38/58 | (2006.01) | |
| C09D 5/00 | (2006.01) | |
| C09D 1/00 | (2006.01) | |
| C22C 38/12 | (2006.01) | |
| C22C 38/22 | (2006.01) | |
| B23K 35/30 | (2006.01) | |
| B23K 35/00 | (2006.01) | |
| C22C 38/04 | (2006.01) | |
| C22C 38/18 | (2006.01) | |
| C22C 38/26 | (2006.01) | |
| C22C 38/28 | (2006.01) | |
| C22C 37/08 | (2006.01) | |
| C22C 37/10 | (2006.01) | |
| C22C 38/00 | (2006.01) | |
| C22C 38/02 | (2006.01) | |
| C22C 38/08 | (2006.01) | |
| C22C 38/14 | (2006.01) | |
| C22C 38/24 | (2006.01) | |
| C22C 38/32 | (2006.01) | |
| C22C 38/36 | (2006.01) | |
| C22C 38/44 | (2006.01) | |
| C22C 38/46 | (2006.01) | |
| C22C 38/48 | (2006.01) | |
| C22C 38/50 | (2006.01) | |
| C22C 38/54 | (2006.01) | |
| C22C 38/56 | (2006.01) | |

(52) U.S. Cl.
CPC ............... *C09D 5/00* (2013.01); *C22C 37/08* (2013.01); *C22C 37/10* (2013.01); *C22C 38/002* (2013.01); *C22C 38/02* (2013.01); *C22C 38/04* (2013.01); *C22C 38/08* (2013.01); *C22C 38/12* (2013.01); *C22C 38/14* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/36* (2013.01); *C22C 38/38* (2013.01); *C22C 38/44* (2013.01); *C22C 38/46* (2013.01); *C22C 38/48* (2013.01); *C22C 38/50* (2013.01); *C22C 38/54* (2013.01); *C22C 38/56* (2013.01); *C23C 30/00* (2013.01); *C22C 29/06* (2013.01); *C22C 29/14* (2013.01); *C22C 32/0052* (2013.01); *C22C 32/0073* (2013.01)

(58) Field of Classification Search
CPC ......... C22C 29/10; C22C 29/14; C22C 38/04; C22C 38/12; C22C 38/14; C22C 38/22; C22C 38/24; C22C 38/26; C22C 38/28; C22C 38/32; C22C 38/36; C22C 38/38; C22C 38/44; C22C 38/46; C22C 38/48; C22C 38/50; C22C 38/54; C22C 38/56; C22C 38/58; C22C 32/00; C22C 32/0005; C22C 32/0047; C22C 32/0052; C22C 32/0057; C22C 32/0063; C22C 32/0073; C23C 30/00; C23C 30/005

See application file for complete search history.

(56) References Cited

U.S. PATENT DOCUMENTS

| | | |
|---|---|---|
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka |
| 3,448,241 A | 6/1969 | Penson et al. |
| 3,554,792 A | 1/1971 | Johnson |
| 3,650,734 A | 3/1972 | Kantor et al. |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Petersen |
| 4,017,339 A | 4/1977 | Okuda et al. |
| 4,042,383 A | 8/1977 | Petersen et al. |
| 4,066,451 A | 1/1978 | Rudy |
| 4,214,145 A | 7/1980 | Zvanut et al. |
| 4,235,630 A | 11/1980 | Babu |
| 4,255,709 A | 3/1981 | Zatsepium et al. |
| 4,277,108 A | 7/1981 | Wallace |
| 4,297,135 A | 10/1981 | Giessen et al. |
| 4,365,994 A | 12/1982 | Ray |
| 4,415,530 A | 11/1983 | Hunt |
| 4,419,130 A | 12/1983 | Slaughter |
| 4,576,653 A | 3/1986 | Ray |
| 4,596,282 A | 6/1986 | Maddy et al. |
| 4,606,977 A | 8/1986 | Dickson et al. |
| 4,635,701 A | 1/1987 | Sare et al. |
| 4,639,576 A | 1/1987 | Shoemaker et al. |
| 4,666,797 A | 5/1987 | Newman et al. |
| 4,673,550 A | 6/1987 | Dallaire et al. |
| 4,762,681 A | 8/1988 | Tassen et al. |
| 4,803,045 A | 2/1989 | Ohriner et al. |
| 4,822,415 A | 4/1989 | Dorfman et al. |
| 4,919,728 A | 4/1990 | Kohl et al. |
| 4,981,644 A | 1/1991 | Chang |
| 5,094,812 A * | 3/1992 | Dulmaine .............. C22C 38/001 420/57 |
| 5,252,149 A | 10/1993 | Dolman |
| 5,306,358 A | 4/1994 | Lai et al. |
| 5,375,759 A | 12/1994 | Hiraishi et al. |
| 5,567,251 A | 10/1996 | Peker et al. |
| 5,570,636 A | 11/1996 | Lewis |
| 5,618,451 A | 4/1997 | Ni |
| 5,820,939 A | 10/1998 | Popoola et al. |
| 5,858,558 A | 1/1999 | Zhao et al. |
| 5,861,605 A | 1/1999 | Ogawa et al. |
| 5,907,017 A | 5/1999 | Ober et al. |
| 5,935,350 A | 8/1999 | Raghu et al. |
| 5,942,289 A | 8/1999 | Jackson |
| 5,988,302 A | 11/1999 | Sreshta et al. |
| 6,117,493 A | 9/2000 | North |
| 6,171,222 B1 | 1/2001 | Lakeland et al. |
| 6,210,635 B1 | 4/2001 | Jackson et al. |
| 6,232,000 B1 | 5/2001 | Singh et al. |
| 6,326,582 B1 | 12/2001 | North |
| 6,331,688 B1 | 12/2001 | Hallén et al. |
| 6,332,936 B1 | 12/2001 | Hajaligo et al. |
| 6,375,895 B1 | 4/2002 | Daemen |
| 6,398,103 B2 | 6/2002 | Hasz et al. |
| 6,441,334 B1 | 8/2002 | Aida et al. |
| 6,582,126 B2 | 6/2003 | North |
| 6,608,286 B2 | 8/2003 | Jiang |
| 6,669,790 B1 | 12/2003 | Gundlach et al. |
| 6,689,234 B2 | 2/2004 | Branagan |
| 6,702,905 B1 | 3/2004 | Qiao et al. |
| 6,702,906 B2 | 3/2004 | Ogawa et al. |
| 6,750,430 B2 | 6/2004 | Kelly |
| 7,052,561 B2 | 5/2006 | Lu et al. |
| 7,219,727 B2 | 5/2007 | Slack et al. |
| 7,285,151 B2 | 10/2007 | Sjodin et al. |
| 7,361,411 B2 | 4/2008 | Daemen et al. |
| 7,491,910 B2 | 2/2009 | Kapoor et al. |
| 7,553,382 B2 | 6/2009 | Branagan et al. |
| 7,569,286 B2 | 8/2009 | Daemen et al. |
| 7,776,451 B2 | 8/2010 | Jiang et al. |
| 7,935,198 B2 | 5/2011 | Branagan et al. |
| 8,070,894 B2 | 12/2011 | Branagan |
| 8,097,095 B2 | 1/2012 | Branagan |
| 8,153,935 B2 | 4/2012 | Jang et al. |

(56) References Cited

U.S. PATENT DOCUMENTS

| | | |
|---|---|---|
| 8,187,529 B2 | 5/2012 | Powell |
| 8,187,725 B2 | 5/2012 | Kiser et al. |
| 8,268,453 B2 | 9/2012 | Dallaire |
| 8,474,541 B2 | 7/2013 | Branagan et al. |
| 8,562,759 B2 | 10/2013 | Cheney et al. |
| 8,562,760 B2 | 10/2013 | Cheney et al. |
| 8,640,941 B2 | 2/2014 | Cheney |
| 8,647,449 B2 | 2/2014 | Cheney et al. |
| 8,658,934 B2 | 2/2014 | Branagan et al. |
| 8,704,134 B2 | 4/2014 | Branagan et al. |
| 8,801,872 B2 | 8/2014 | Wright et al. |
| 8,808,471 B2 | 8/2014 | Wright et al. |
| 8,973,806 B2 | 3/2015 | Cheney |
| 9,174,293 B2 | 11/2015 | Meyer |
| 9,193,011 B2 | 11/2015 | Mars et al. |
| 9,309,585 B2 | 4/2016 | Cheney et al. |
| 2001/0019781 A1 | 9/2001 | Hasz |
| 2002/0054972 A1 | 5/2002 | Charpentier et al. |
| 2002/0148533 A1 | 10/2002 | Kim et al. |
| 2004/0062677 A1 | 4/2004 | Chabenat et al. |
| 2004/0079742 A1 | 4/2004 | Kelly |
| 2004/0115086 A1 | 6/2004 | Chabenat et al. |
| 2004/0206726 A1 | 10/2004 | Daemen et al. |
| 2005/0047952 A1 | 3/2005 | Coleman |
| 2005/0109431 A1 | 5/2005 | Kernan et al. |
| 2006/0093752 A1 | 5/2006 | Darolia et al. |
| 2006/0191606 A1 | 8/2006 | Ogawa et al. |
| 2006/0260583 A1 | 11/2006 | Abi-Akar et al. |
| 2007/0029295 A1 | 2/2007 | Branagan |
| 2007/0090167 A1 | 4/2007 | Arjakine et al. |
| 2007/0187369 A1 | 8/2007 | Menon et al. |
| 2007/0253856 A1 | 11/2007 | Vecchio et al. |
| 2007/0284018 A1 | 12/2007 | Hamano et al. |
| 2008/0001115 A1 | 1/2008 | Qiao et al. |
| 2008/0031769 A1 | 2/2008 | Yeh |
| 2008/0149397 A1 | 6/2008 | Overstreet |
| 2008/0241580 A1 | 10/2008 | Kiser et al. |
| 2008/0241584 A1 | 10/2008 | Daemen et al. |
| 2009/0017328 A1 | 1/2009 | Katoh et al. |
| 2009/0123765 A1 | 5/2009 | Branagan |
| 2009/0258250 A1 | 10/2009 | Daemen et al. |
| 2009/0285715 A1 | 11/2009 | Arjakine et al. |
| 2010/0009089 A1 | 1/2010 | Junod et al. |
| 2010/0044348 A1 | 2/2010 | Buchmann |
| 2010/0101780 A1 | 4/2010 | Ballew et al. |
| 2010/0155236 A1 | 6/2010 | Lee et al. |
| 2010/0166594 A1 | 7/2010 | Hirata et al. |
| 2010/0189588 A1 | 7/2010 | Kawatsu et al. |
| 2010/0258217 A1 | 10/2010 | Kuehmann |
| 2011/0004069 A1 | 1/2011 | Ochs et al. |
| 2011/0064963 A1 | 3/2011 | Cheney et al. |
| 2011/0100720 A1 | 5/2011 | Branagan et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2012/0055903 A1 | 3/2012 | Izutani et al. |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0224992 A1 | 9/2012 | Cheney et al. |
| 2012/0288400 A1 | 11/2012 | Hirata et al. |
| 2013/0094900 A1 | 4/2013 | Folkmann et al. |
| 2013/0167965 A1 | 7/2013 | Cheney et al. |
| 2013/0171367 A1 | 7/2013 | Kusinski et al. |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0294962 A1 | 11/2013 | Wallin et al. |
| 2014/0065316 A1 | 3/2014 | Cheney |
| 2014/0105780 A1 | 4/2014 | Cheney |
| 2014/0219859 A1 | 8/2014 | Cheney |
| 2014/0234154 A1 | 8/2014 | Cheney et al. |
| 2014/0248509 A1 | 9/2014 | Cheney |
| 2015/0075681 A1 | 3/2015 | Wright et al. |
| 2015/0106035 A1 | 4/2015 | Vecchio et al. |
| 2015/0147591 A1 | 5/2015 | Cheney |
| 2015/0275341 A1 | 10/2015 | Cheney |
| 2015/0284817 A1 | 10/2015 | Snyder et al. |
| 2015/0284829 A1 | 10/2015 | Cheney |
| 2015/0367454 A1 | 12/2015 | Cheney |
| 2016/0017463 A1 | 1/2016 | Cheney |
| 2016/0024621 A1 | 1/2016 | Cheney |
| 2016/0024624 A1 | 1/2016 | Cheney |
| 2016/0024628 A1 | 1/2016 | Cheney |
| 2016/0083830 A1 | 3/2016 | Cheney |
| 2016/0168670 A1 | 6/2016 | Cheney |
| 2016/0201169 A1 | 7/2016 | Vecchio |
| 2016/0201170 A1 | 7/2016 | Vecchio |
| 2016/0289803 A1 | 10/2016 | Cheney |

FOREIGN PATENT DOCUMENTS

| | | | |
|---|---|---|---|
| CN | 102233490 A | 11/2011 | |
| CN | 102357750 A | 2/2012 | |
| CN | 102686762 | 3/2014 | |
| CN | 103635284 | 3/2014 | |
| CN | 104039483 | 9/2014 | |
| CN | 104838032 | 8/2015 | |
| DE | 2754437 | 7/1979 | |
| DE | 2754437 A1 * | 7/1979 | ........... B23K 35/308 |
| DE | 33 20 513 | 12/1983 | |
| DE | 42 02 828 | 8/1993 | |
| EP | 0 365 884 | 5/1990 | |
| EP | 1 338 663 | 8/2003 | |
| EP | 2 305 415 | 8/2003 | |
| EP | 1 857 204 | 11/2007 | |
| EP | 2 778 247 | 9/2014 | |
| EP | 2 563 942 | 10/2015 | |
| GB | 2 153 846 A | 8/1985 | |
| IN | MUMNP-2003-00842 | 4/2005 | |
| JP | 54119320 A * | 9/1979 | |
| JP | 58-132393 | 8/1983 | |
| JP | 60-133996 A | 7/1985 | |
| JP | 63-026205 A | 2/1988 | |
| JP | 03-133593 A | 6/1991 | |
| JP | 2012-000616 | 1/2012 | |
| KR | 10-0935816 B1 * | 1/2010 | ............. C22C 38/02 |
| TW | 200806801 A | 2/2008 | |
| WO | WO 84/00385 | 2/1984 | |
| WO | WO 84/04760 | 12/1984 | |
| WO | WO 2006/086350 | 8/2006 | |
| WO | WO 2008/011448 | 1/2008 | |
| WO | WO 2010/044740 | 4/2010 | |
| WO | WO 2011/021751 | 2/2011 | |
| WO | WO 2011/035193 | 3/2011 | |
| WO | WO 2011/071054 | 6/2011 | |
| WO | WO 2011/158706 | 12/2011 | |
| WO | WO 2012/037339 | 3/2012 | |
| WO | WO 2012/129505 | 9/2012 | |
| WO | WO 2013/101561 | 7/2013 | |
| WO | WO 2013/133944 | 9/2013 | |
| WO | WO 2014/059177 | 4/2014 | |
| WO | WO 2014/081491 | 5/2014 | |
| WO | WO 2015/081209 | 6/2015 | |

OTHER PUBLICATIONS

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.

Cheney, et al.: "Development of quaternary Fe-based bulk metallic glasses," Materials Science and Engineering, vol. 492, No. 1-2, Sep. 25, 2008, pp. 230-235.

Cheney: Modeling the Glass Forming Ability of Metals. A Dissertation submitted in partial satisfaction of the Requirements for the degree of Doctor of Philosophy. University of California, San Diego. Dec. 2007.

(56) References Cited

OTHER PUBLICATIONS

Cr-C Phase Diagram [online], [retrieved on Jan. 27, 2015]. Retrieved from the Internet: http://www.azom.com/work/3ud2quvLOU9g4VBMjVEh_files/image002.gif.
Davis, Jr, ed. Stainless steels. ASM International, 1994; p. 447.
International Search Report and Written Opinion re PCT Application No. PCT/US2013/64391, mailed Dec. 16, 2013.
International Preliminary Report on Patentability re PCT Application No. PCT/US2013/64391, issued Apr. 14, 2015.
Iron-Carbon (Fe-C) Phase diagram [online], [retrieved on Jan. 27, 2014]. Retrieved from the internet: <URL:http://www.calphad.com/iron-carbon.html>.
Khalifa, et al.: "Effect of Mo—Fe sunstitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.
Miracle, D.B.: The efficient cluster packing model—An atomic structural model for metallic glasses, Acta Materialia vol. 54, Issue 16, Sep. 2006, pp. 4317-4336.
Mo—C Phase Diagram [online], [retrieved on Jan. 27, 2015]. Retrieved from the Internet: <URL: http://factsage.cn/fact/documentation/SGTE/C-Mo.jpg >.
Nb—C Phase Diagram [online], [retrieved on Jan. 27, 2015]. Retrieved from the Internet: <URL: http://www.crct.polymtl.ca/fact/documentation/BINARY/C-Nb.jpg >.
Tillack, et al.: "Selection of Nickel, Nickel-Copper, Nickel-Cromium-Iron Allows", AMS Handbook, Welding, Brazing and Soldering, vol. 6, Dec. 1, 1993 (Dec. 1, 1993) pp. 586-592, XP008097120, p. 589.
Titanium-Boron (TiB) Phase Diagram [online], [retrieved on Jan. 27, 2015]. Retrieved from the internet:<URL:http://www.calphad.com/titaniumboron.html>.
Yoo et al.: "The effect of boron on the wear behavior of iron-based hardfacing alloys for nuclear power plants valves," Journal of Nuclear Materials 352 (2006) 90-96.
Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

* cited by examiner

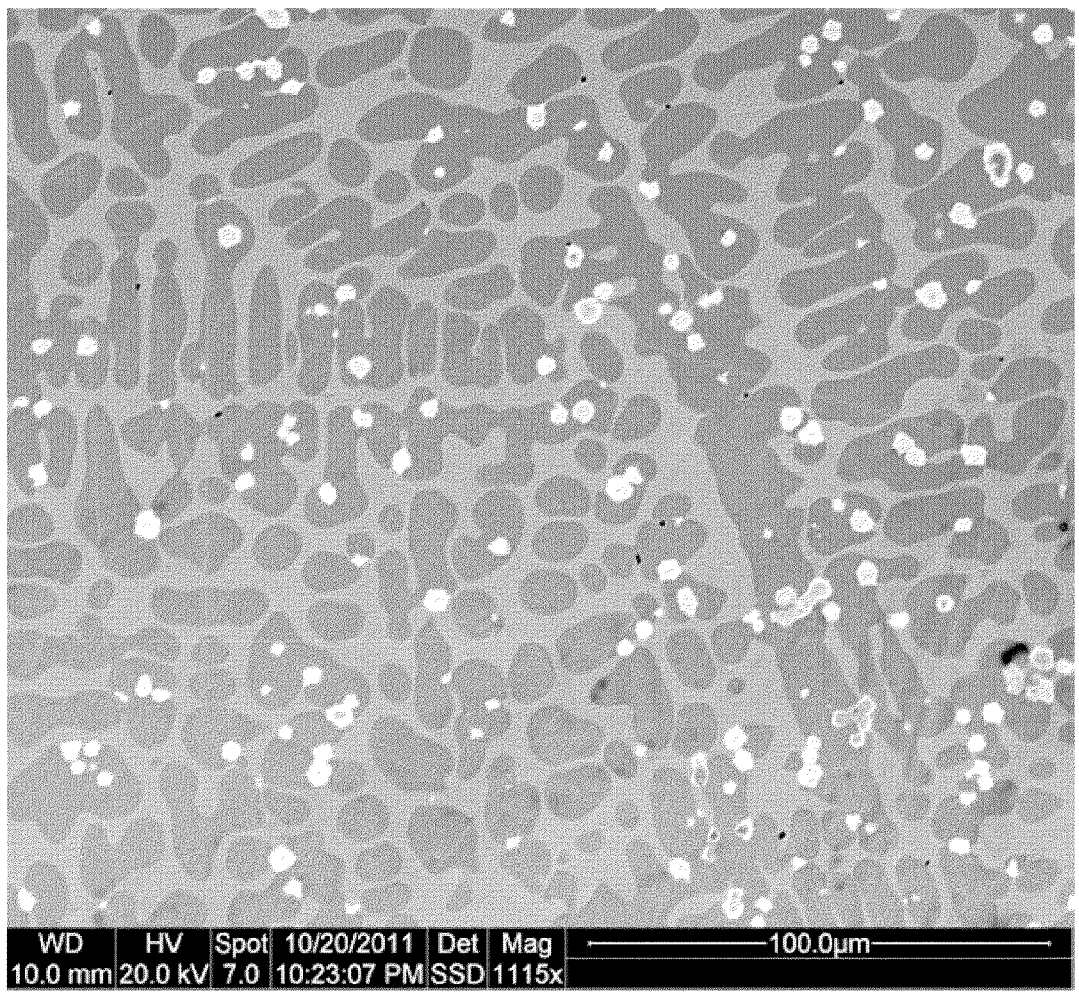
FIG. IA

NON-MAGNETIC METAL ALLOY COMPOSITIONS AND APPLICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The disclosure relates to non-magnetic metal alloys with excellent wear properties for use in dynamic three-body tribological wear environments where an absence of magnetic interference is required.

Description of the Related Art

Conditions of abrasive wear can be damaging as they often involve sand, rock particles, or other extremely hard media wearing away against a surface. Applications which see severe abrasive wear in the prior art typically utilize materials of high hardness, 40 $R_c$+, encompassing hard metals or carbides.

In certain wear applications, e.g., exploration wells in crude oil or natural gas fields such as directional bores and the like, it is advantageous for drilling string components including drill stems to be made of materials with magnetic permeability values below about 1.02 or possibly even less than 1.01 (API Specification 7 regarding drill string components), in order to be able to follow the exact position of the bore hole and to ascertain and correct deviations from its projected course.

A number of other disclosures are directed to non-magnetic alloys for use in forming drilling components including U.S. Pat. No. 4,919,728 which details a method for manufacturing non-magnetic drilling string components. US Patent Publication No. 2005/0047952 describes a non-magnetic corrosion resistant high strength steel. Although both patents describe magnetic permeability of less than 1.01, the compositions described have a maximum of 0.15 wt % carbon, 1 wt % silicon and no boron. The low levels and absence of the above mentioned hard particle forming elements suggests that the alloys would not precipitate sufficient, if any, hard particles. It can be further expected that inadequate wear resistance and hardness for high wear environments would be provided. U.S. Pat. No. 4,919,728 describes alloys which contain carbon levels below 0.25 wt % while US Patent Publication No. 2005/0047952 details carbon levels below 0.1 wt %, significantly below the alloys discussed in this disclosure. With these levels of carbon in conjunction with the absence of boron, few hard particles can form which impart wear resistance to a hardband. Also in U.S. Pat. No. 4,919,728, a method for cold working at various temperatures is used to achieve the desired properties. Cold working is not possible in coating applications such as hardfacing. The size and geometry of the parts would require excessive deformations loads as well as currently unknown methods to uniformly cold work specialized parts such as tool joints.

US Patent Publication No. 2010/0009089 details a non-magnetic for coatings adapted for high wear applications where non-magnetic properties are required. The alloys listed in this publication are nickel-based with preformed tungsten carbide hard spherical particles poured into the molten weld material during welding in the amount of 30-60 wt %.

Disclosures offering alloying solutions for competing wear mechanisms in oil & gas drilling hardfacing applications include but are not limited to U.S. Pat. Nos. 4,277,108; 4,666,797; 6,117,493; 6,326,582; 6,582,126; 7,219,727; and US Patent Publication No. 2002/0054972. US Publication Nos. 2011/0220415 and 2011/0042069 disclose an ultra-low friction coating for drill stem assemblies. U.S. Pat. Nos. 6,375,895, 7,361,411, 7,569,286, 20040206726, 20080241584, and 2011/0100720 disclose the use of hard alloys for the competing wear mechanisms.

There is still a need for non-magnetic alloy compositions for hardbanding components for use in directional drilling applications that have resistance to abrasion. There is also a need for an improved method to protect drill collars from heavy abrasion during drilling operations.

The austenite phase described as a component of this disclosure is naturally paramagnetic while ferrite which composes typical hardbanding is ferromagnetic. When a magnet is brought into close proximity or contact with a ferromagnetic hardband, it exhibits attractive forces. A magnet exhibits no detectable attraction to an entirely austenitic material.

Magnetic permeability is the measure of how well a material can support a magnetic field within it. The relative magnetic permeability of a vacuum is 1. The definition of a non-magnetic material suitable for use on a drill collar is <1.01 according to API Specification 7. Even slight amounts of ferrite or martensite in a mainly austenitic material can cause the magnetic permeability to exceed 1.01. Ferrite and martensite have a magnetic permeability greater than 50 depending on the alloy composition. The magnetic permeability of magnetic hardbanding materials is not readily available because it is generally not of concern in applications where they are used. However, it can be inferred that the magnetic permeability will be similar to that of traditional magnetic materials such as alloy steels.

According to API Specification 7, a non-magnetic material for use on drill collars must maintain a magnetic field gradient of ±0.05. The magnetic field gradient is a measure of the uniformity of the magnetic field.

SUMMARY

In one aspect, the disclosure relates to a drilling component for use in directional drilling applications capable of withstanding service abrasion. The drilling component has at least a surface protected by a welded layer comprising an alloy composition containing in wt. %: Mn: 8-20, Cr: 0-6, Nb: 2-8, V: 0-3, C: 1-6, B: 0-1.5, W: 0-10, Ti: 0-0.5, balance Fe and impurities as trace elements. The welded layer exhibits a hardness of at least 40 $R_c$, in the as-welded condition, a wear rate of less than 0.6 grams of mass loss as measured according to ASTM G65-04, Procedure A, and a magnetic permeability value of less than 1.01.

In a second aspect, a hardbanding for protecting a drilling component for use in directional drilling is provided. The hardbanding comprises: a layer comprising an alloy composition having in wt. %: Mn: 8-16, Cr: 3-6, Nb: 3-6, V: 0-1, C: 1.5-5, B: 0-1.5, W: 3-6, Ti: 0-0.5, balance Fe and impurities as trace elements. The layer forms an austenitic microstructure containing embedded hard particles in an amount of less than 50 vol. %.

In a third aspect, a method for prolonging service life of a drilling component for use in directional drilling is provided. The method comprises: welding onto at least a surface of the drilling component an alloy composition containing in wt. %: Mn: 8-20, Cr: 0-6, Nb: 2-8, V: 0-3, C: 1-6, B: 0-1.5, W: 0-10, Ti: 0-0.5, balance Fe and impurities as trace elements. The welding is by any of laser welding, shielded metal arc welding (SMAW), stick welding, plasma transfer arc welding (PTAW), gas metal arc-welding (GMAW), metal inert gas welding (MIG), submerged arc welding (SAW), open arc welding (OAW), and combinations thereof. The welded layer exhibits a hardness of at least 40 $R_c$, a wear rate of less than 0.6 grams of mass loss as measured according to ASTM G65-04, Procedure A, and a magnetic permeability value of less than 1.01.

BRIEF DESCRIPTION OF THE DRAWINGS

FIG. 1A is a Scanning Electron micrograph of an austenitic alloy demonstrating large, interconnected carbides providing paths for crack propagation.

DETAILED DESCRIPTION

Figure 1B:
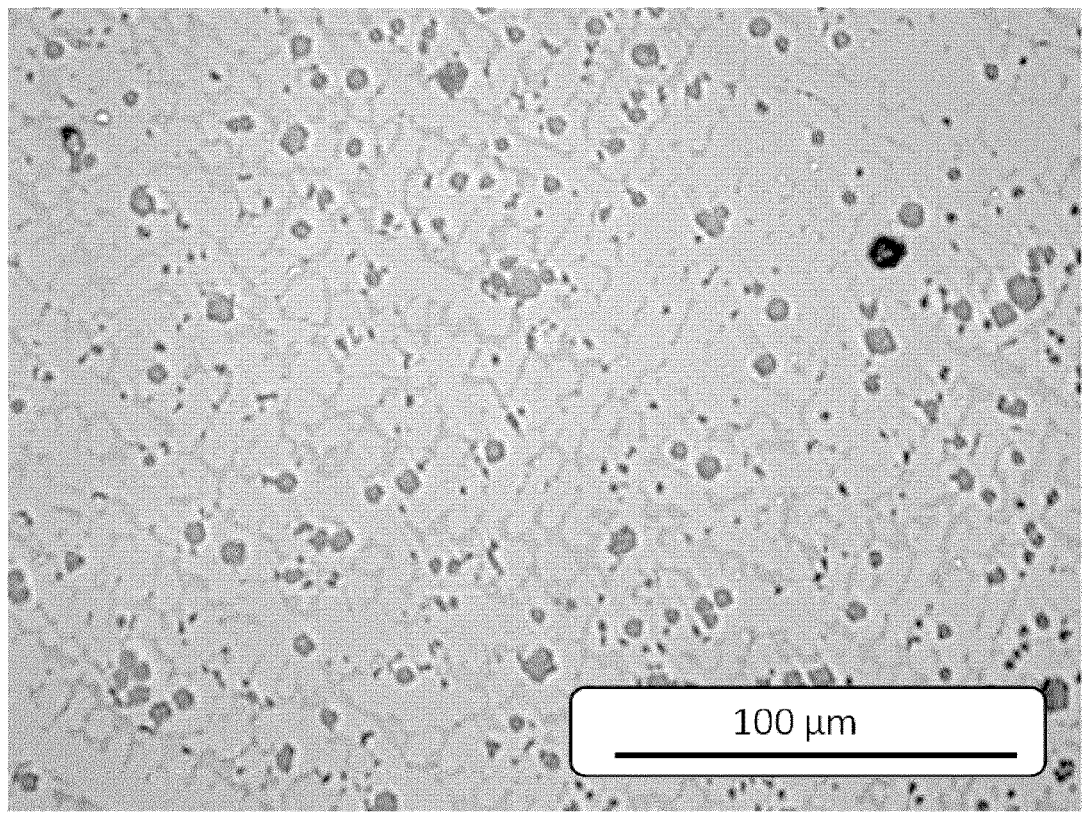
FIG. 1B is an optical micrograph of one embodiment of the alloy in this patent which demonstrates finely distributed hard particles in a soft austenitic matrix.

The following terms will be used throughout the specification and will have the following meanings unless otherwise indicated.

"Casing" is defined as a metal pipe or tube used as a lining for water, oil, or gas well.

"Coating" is comprised of one or more adjacent layers and any included interfaces. Coating also refers to a layer placed directly on the substrate of a base body assembly to be protected, or the hardbanding placed on a base substrate material. In another embodiment, "coating" refers to the top protective layer.

A "layer" is a thickness of a material that may serve a specific functional purpose such as reduced coefficient of friction, high stiffness, or mechanical support for overlying layers or protection of underlying layers.

"Hardband" (or "hardface") refers to a process to deposit a layer of a special material, e.g., super hard metal, onto drill pipe tool joints, collars and heavy weight pipe in order to protect both the casing and drill string components from wear associated with drilling practices.

"Hardbanding" (or "hardband" or "hardfacing") refers to a layer of superhard material to protect at least a portion of the underlying equipment or work piece, e.g., tool joint, from wear such as casing wear. Hardbanding can be applied as an outermost protective layer, or an intermediate layer interposed between the outer surface of the body assembly substrate material and the buttering layer(s), buffer layer, or a coating.

"Coating" may be used interchangeably with "hardbanding," referring to the layer of superhard material to protect the underlying equipment.

"Hard particles" refer to any single or combination of hard boride, carbide, borocarbide particles.

"As-welded" refers to the condition of a weld without work hardening, heat treating, etc. or any other process which alter the properties or microstructure through post-welding processing.

The disclosure relates to a non-magnetic metal alloy for use in single or multi-stage tribological processes involving multiple bodies of varying hardness, and applications employing the metal alloy, e.g., hardbanding (or hardfacing) applications.

Metal Alloy Composition

The metal alloy for hardfacing is characterized as having an austenitic microstructure (face centered cubic gamma phase) and consisting essentially of: Mn: 8-20, Cr: 0-6, Nb: 2-8, V: 0-3, C: 1-6, B: 0-1.5, W: 0-10, Ti: 0-0.5, balance Fe and impurities as trace elements, for a non-magnetic composition with desirable effects including minimal, if any, cracking in the coating and a high resistance to abrasive wear.

In one embodiment, the alloy is any of the followings in wt. %:

A33: Fe: bal, Mn: 10, Cr: 5, Nb: 4, V: 0.5, C: 4, W: 5, Ti: 0.25

A34: Fe: bal, Mn: 10, Cr: 5, Nb: 4, V: 0.5, C: 3.5, W: 5, Ti: 0.20

A36: Fe: bal, Mn: 16, Cr: 5, Nb: 4, V: 0.5, C: 3.25, W: 5, Ti: 0.20

A35: Fe: bal, Mn: 10, Cr: 5, Nb: 4, V: 0.5, C: 3, W: 5, Ti: 0.20

The alloy incorporates the above elemental constituents a total of 100 wt. %. In some embodiment, the alloy may include, may be limited to, or may consist essentially of the above named elements. In one embodiment, the alloy may include 2% or less of impurities. Impurities may be understood as elements or compositions that may be included in the alloys due to inclusion in the feedstock components, through introduction in the manufacturing process. In another embodiment, the feedstock contains silicon in the amount such that the final alloy contains 0.15 wt % although the ingot form did not contain any.

In all embodiments of the present disclosure, the hard particles are precipitated from the molten metal during solidification of the alloy. The soft austenite matrix provides toughness and ductility to the alloy while the hard particles impart the wear resistance. The soft matrix prevents spalling of the hard particles. The fine distribution of hard particles also allows for uniform wear and prevents selective wear of the soft matrix.

Other alloys such as those listed in US Patent Publication Nos. 2010/0009089 use preformed carbides or borides which are poured into the solidifying metal during welding. These carbides and borides are larger where the particle size ranges from 50-180 μm. Particles this large often spall due to poor adhesion with the matrix and break leading to reduced wear resistance Using preformed carbides requires a large hopper directly above the welding arc in order to feed the particles into the molten weld. In this process, feeding the carbides into the weld too quickly or too slowly can be detrimental to the performance of the weld. Also, not only does the welding wire need to be purchased, but preformed carbides as well increasing the overall cost of applying the hardface. The alloys described in the present disclosure can be deposited using standard welding process without feeding preformed carbides into the weld. This simplifies the application process allowing for more uniform and repeatable hardfaced layers both on a single part and between multiple parts.

In one embodiment, the metal alloy is applied as a coating of Fe-based (austenitic) matrix containing fine-scaled hard boride, carbide, and complex carbide, e.g., borocarbide particles (e.g., $M_2B$ or MC, where M is a transition metal) having average particle sizes of 100 nm-20 μm, in an amount of less than 50 vol. %. In another embodiment, the hard particles are present in an amount of less than 30 vol. %. In one embodiment, the carbide particles have an average particle size of 1-5 μm.

In one embodiment, the boride phase is represented as $M_2B$, wherein M is a transition metal. In another embodiment, the embedded hard particles in the austenitic Fe-based matrix contain Nb, Cr, and W with both carbon and/or boron. In yet another embodiment, the particles are in the form of embedded Nb carbide and Fe—W-boro carbide precipitates. In another embodiment, the Nb carbide precipitates are less than 5 μm in size. In every embodiments, the Nb carbide precipitates first at higher temperatures, acting as a site for lower temperature forming carbides to nucleate.

Method for Designing Hardbanding

In one embodiment, the alloy may be formed by blending various feedstock materials together, which may then be melted in a hearth or furnace and formed into ingots. The ingots can be re-melted and flipped one or more times, which may increase homogeneity of the ingots.

Each ingot produced was evaluated examining its microstructure, hardness and magnetic permeability. Incremental changes in composition were made in each successive ingot, leading to the final alloys. The compositions of the ingots made are listed in Table I.

Each composition after melting into ingot form is sectioned on a wet abrasive saw as to avoid heating the ingot and subsequently altering the microstructure. The magnetic permeability is measured using a Low-Mu Magnetic Permeability Tester manufactured by Severn Engineering. A reference standard with a known magnetic permeability is placed in the tester. The tester is comprised of the reference standard and a pivoting magnet. The magnet extends from the side of the tester opposite the reference standard. The magnet tip is brought into contact with the surface of the ingot. If the magnet is not attracted to the ingot, then the magnetic permeability is less than that of the reference standard being used. The magnetic permeability of each ingot composition is listed in Table II.

TABLE II

| Alloy Name | Magnetic Permeability. | Hardness (HRc) |
| --- | --- | --- |
| A1 | no | 24 |
| A2 | no | 29 |
| A3 | no | 33 |
| A4 | yes | 27.5 |
| A5 | no | 31 |
| A6 | no | 32 |
| A7 | no | 35 |
| A8 | Yes | NA |
| A9 | Yes | NA |
| A10 | Yes | NA |

TABLE I

Ingot Compositions
amounts in weight percent

| Alloy Name | Fe | Mn | Cr | Nb | V | C | B | W | Si | Ti | Ni |
| --- | --- | --- | --- | --- | --- | --- | --- | --- | --- | --- | --- |
| A1 | 54.5 | 2 | 18 | 4 | 2 | 1.25 | 0.85 | 7 | 0.15 | 0.25 | 10 |
| A2 | 60.5 | 2 | 15 | 4 | 2 | 1.25 | 0.85 | 7 | 0.15 | 0.25 | 7 |
| A3 | 60.25 | 2 | 15 | 4 | 2 | 1.5 | 0.85 | 7 | 0.15 | 0.25 | 7 |
| A4 | 60.5 | 2 | 15 | 4 | 2 | 1 | 1.1 | 7 | 0.15 | 0.25 | 7 |
| A5 | 60.25 | 2 | 15 | 4 | 2 | 1 | 1.35 | 7 | 0.15 | 0.25 | 7 |
| A6 | 60 | 2 | 15 | 4 | 2 | 1 | 1.6 | 7 | 0.15 | 0.25 | 7 |
| A7 | 59.2 | 2 | 15 | 4.3 | 2 | 1.5 | 1.6 | 7 | 0.15 | 0.25 | 7 |
| A8 | 79.1 | 1.5 | 5 | 4 | 0.5 | 1.5 | 1 | 5 | 0.15 | 0.25 | 2 |
| A9 | 78.31 | 2.50 | 4.95 | 3.96 | 0.50 | 1.49 | 1.00 | 4.95 | 0.15 | 0.25 | 2.00 |
| A10 | 76.74 | 2.45 | 4.85 | 3.88 | 0.49 | 1.46 | 0.98 | 4.85 | 0.15 | 0.24 | 4 |
| A11 | 75.21 | 2.40 | 4.75 | 3.80 | 0.48 | 1.43 | 0.96 | 4.75 | 0.14 | 0.24 | 6.00 |
| A12 | 72.58 | 6.00 | 4.59 | 3.67 | 0.46 | 1.38 | 0.93 | 4.59 | 0.14 | 0.23 | 5.79 |
| A13 | 65.25 | 10.00 | 5 | 4 | 0.5 | 1.5 | 1 | 5 | 1.5 | 0.25 | 6.00 |
| A14 | 72.75 | 10 | 5 | 4 | 0.5 | 1.5 | 1 | 5 | 0 | 0.25 | 0 |
| A15 | 72.25 | 10 | 5 | 4 | 0.5 | 1 | 1 | 5 | 1 | 0.25 | 0 |
| A16 | 72.00 | 10 | 5 | 4 | 0.5 | 1.25 | 1 | 5 | 1 | 0.25 | 0 |
| A17 | 71.28 | 11.00 | 4.95 | 3.96 | 0.50 | 1.24 | 0.99 | 4.95 | 0.99 | 0.25 | 0.00 |
| A18 | 69.85 | 13.00 | 4.85 | 3.88 | 0.49 | 1.21 | 0.97 | 4.85 | 0.97 | 0.24 | 0.00 |
| A19 | 69.25 | 12 | 5 | 4 | 0.5 | 1.5 | 1 | 5 | 1.5 | 0.25 | 0 |
| A20 | 68.75 | 12 | 5 | 4 | 0.5 | 1.5 | 1.5 | 5 | 1.5 | 0.25 | 0 |
| A21 | 70.25 | 12 | 5 | 4 | 0.5 | 2 | 1 | 5 | 0 | 0.25 | 0 |
| A22 | 68.8 | 14.0 | 4.9 | 3.9 | 0.5 | 2.0 | 1.0 | 4.9 | 0.0 | 0.2 | 0.0 |
| A23 | 67.00 | 16.00 | 4.80 | 3.84 | 0.48 | 1.92 | 0.96 | 4.80 | 0.00 | 0.24 | 0.00 |
| A24 | 67.80 | 16.00 | 5.00 | 4.00 | 0.50 | 1.50 | 0.00 | 5.00 | 0.00 | 0.20 | 0.00 |
| A25 | 66.80 | 16.00 | 5.00 | 4.00 | 0.50 | 2.50 | 0.00 | 5.00 | 0.00 | 0.20 | 0.00 |
| A26 | 66.30 | 16.00 | 5.00 | 4.00 | 0.50 | 3.00 | 0.00 | 5.00 | 0.00 | 0.20 | 0.00 |
| A27 | 72.80 | 10.00 | 5.00 | 4.00 | 0.50 | 2.50 | 0.00 | 5.00 | 0.00 | 0.20 | 0.00 |
| A28 | 72.30 | 10.00 | 5.00 | 4.00 | 0.50 | 2.50 | 0.50 | 5.00 | 0.00 | 0.20 | 0.00 |
| A29 | 69.41 | 9.60 | 4.80 | 3.84 | 0.48 | 2.40 | 0.48 | 9.00 | 0.00 | 0.19 | 0.00 |
| A30 | 72.80 | 10.00 | 5.00 | 4.00 | 0.50 | 0.50 | 2.00 | 5.00 | 0.00 | 0.20 | 0.00 |
| A31 | 68.23 | 16.00 | 4.60 | 3.66 | 0.47 | 0.47 | 1.88 | 4.70 | 0.00 | 0.19 | 0.00 |
| A32 | 65.30 | 16.00 | 5.00 | 4.00 | 0.50 | 4.00 | 0.00 | 5.00 | 0.00 | 0.20 | 0.00 |
| A33 | 71.30 | 10 | 5.00 | 4.00 | 0.50 | 4.00 | 0.00 | 5.00 | 0.00 | 0.20 | 0.00 |
| A34 | 71.80 | 10 | 5.00 | 4.00 | 0.50 | 3.50 | 0.00 | 5.00 | 0.00 | 0.20 | 0.00 |
| A35 | 72.30 | 10 | 5.00 | 4.00 | 0.50 | 3.00 | 0.00 | 5.00 | 0.00 | 0.20 | 0.00 |
| A36 | 72.05 | 10 | 5.00 | 4.00 | 0.50 | 3.25 | 0.00 | 5.00 | 0.00 | 0.20 | 0.00 |
| A37 | 65.80 | 10.00 | 12.00 | 4.00 | 0.50 | 2.50 | 0.00 | 5.00 | 0.00 | 0.20 | 0.00 |

TABLE II-continued

| Alloy Name | Magnetic Permeability. | Hardness (HRc) |
|---|---|---|
| A11 | Yes | NA |
| A12 | >1.04 | NA |
| A13 | <1.03 | 34 |
| A14 | <1.02 | 53.5 |
| A15 | >1.04 | 47 |
| A16 | >1.04 | NA |
| A17 | >1.04 | 43 |
| A18 | <1.02 | 38 |
| A19 | >1.04 | 46.5 |
| A20 | >1.04 | NA |
| A21 | >1.04 | 56 |
| A22 | <1.03 | 57.5 |
| A23 | >1.04 | 60 |
| A24 | <1.01 | 29 |
| A25 | <1.01 | 37 |
| A26 | <1.01 | 40 |
| A27 | <1.01 | 35 |
| A28 | <1.01 | 48 |
| A29 | <1.01 | 36 |
| A30 | >1.04 | 54 |
| A31 | >1.04 | 35 |
| A32 | <1.01 | 50 |
| A33 | <1.01 | 52 |
| A34 | <1.02 | 41 |
| A35 | <1.01 | 41.5 |
| A36 | <1.01 | 46 |
| A37 | <1.01 | 39 |

Each ingot composition after magnetic permeability testing is measured, the hardness is determined using a Rockwell C hardness tester. An average of 5 hardness measurements is recorded as the hardness of that ingot. The hardness of each ingot composition is detailed in Table II.

Achieving both a sufficiently low magnetic permeability and high as-welded hardness is difficult. The non-magnetic austenite is softer than the magnetic ferrite. Examining a magnetic and a non-magnetic alloy with the same volume percentage of hard particles, the non-magnetic alloy will be significantly softer.

For ingots A1-A11, they were made prior to having a magnetic permeability test method. They were evaluated using a hand-magnet as either magnetic or non-magnetic. Only those alloys showing no magnetism using the hand magnet were hardness tested.

The microstructure of each ingot is evaluated by optical microscopy. The desired microstructure contains a sufficient amount of the ductile austenite matrix along with embedded hard particles. Furthermore, a large volume fraction of finely distributed hard particles is desired. Large interconnected hard particles are undesirable due to increasing the brittleness of the ingot as shown in FIG. 1A. Fine disconnected hard particles as shown in FIG. 1B reduce or eliminate paths for crack propagation, decreasing the likelihood of cracking during the welding process or in service.

Combinations of powders may be contained in conventional steel sheaths, which when melted may provide the targeted alloy composition. The steel sheaths may include plain carbon steel, low, medium, or high carbon steel, low alloy steel, or stainless steel sheaths.

The ingots may then be melted and atomized or otherwise formed into an intermediate or final product. The forming process may occur in a relatively inert environment, including an inert gas. Inert gasses may include, for example, argon or helium. If atomized, the alloy may be atomized by centrifugal, gas, or water atomization to produce powders of various sizes, which may be applied to a surface to provide a hard surface.

The alloys may be provided in the form of stick, wire, powder, cored wire, billet, bar, rod, plate, sheet, and strip. In one embodiment, the alloys are formed into a stick electrode, e.g., a wire, of various diameters, e.g., 1-5 mm. In some embodiments, the cored wire may contain flux, which may allow for welding without a cover gas without porosity-forming in the weld deposit.

In one embodiment, the metal alloys are applied onto a surface using techniques including but not limited to thermal spray coating, laser welding, weld-overlay, laser cladding, vacuum arc spraying, plasma spraying, and combinations thereof. In another embodiment, the alloys are deposited as wire feedstock employing hardfacing known in the art, e.g., weld overlay. The alloys can be applied with mobile or fixed, semi or automatic welding equipment. In one embodiment, the alloys are applied using any of laser welding, shielded metal arc welding (SMAW), stick welding, plasma transfer arc welding (PTAW), gas metal arc-welding (GMAW), metal inert gas welding (MIG), submerged arc welding (SAW), or open arc welding (OAW).

In one embodiment, the alloy is deposited onto a machined surface or alternatively, a surface blast cleaned to white metal (e.g., ISO 8501-1). The depth of the machined surface is grooved for flush type application depends on the welding applicator. In one embodiment for application on a used pipe, the existing hardbanding is first completely removed by gouging, grinding, or using other suitable techniques.

In one embodiment, the surfaces for deposition are first preheated at a temperature of 200° C. or greater, e.g., 275-500° C., for 0.01 hours to 100 hours. In one embodiment, the preheat may reduce or prevent cracking of the deposited welds.

The alloy may be applied to a surface in one or more layers as an overlay. In one embodiment, each layer having an individual thickness of 1 mm to 10 mm. In one embodiment, the overlay has a total thickness of 1 to 30 mm. In one embodiment, the width of the individual hard-band ranges from 5 mm to 40 mm. In another embodiment, the width of the total weld overlay ranges from 5 mm to 20 feet.

After deposition on a substrate, the alloy is allowed to cool to form a protective coating. In one embodiment, the cooling rate ranges from 100 to 5000 K/s, a rate sufficient for the alloy to produce iron rich phases containing embedded hard particles (e.g., carbides, borides, and/or borocarbides). After weld deposition, cooling in open air can cause a cooling rate which is too rapid, leading to cracking of the weld. In most cases, wrapping of the welded part with a thermally insulating blanket is sufficient to reduce the cooling rate to an acceptable level.

Properties

A work piece having at least a portion of its surface coated or having a welded layer of the austenitic alloy composition, e.g., a hardbanding layer, is characterized as having an as-welded macro-hardness as measured via standard Rockwell C test of greater 40 $R_c$ in one embodiment; 45 $R_c$ in a second embodiment; and at least 50 $R_c$ in a third embodiment.

The alloy composition as deposited on the surface of a work piece is characterized as being crack-free, as inspected by any of magnetic particle inspection, eddy current inspection, etching, visual inspection, hardness checking, dye penetration inspection, or ultrasound inspection. The absence of cracks in the coating protects the underlying part from exposure to any corrosive media present.

Figure 2:
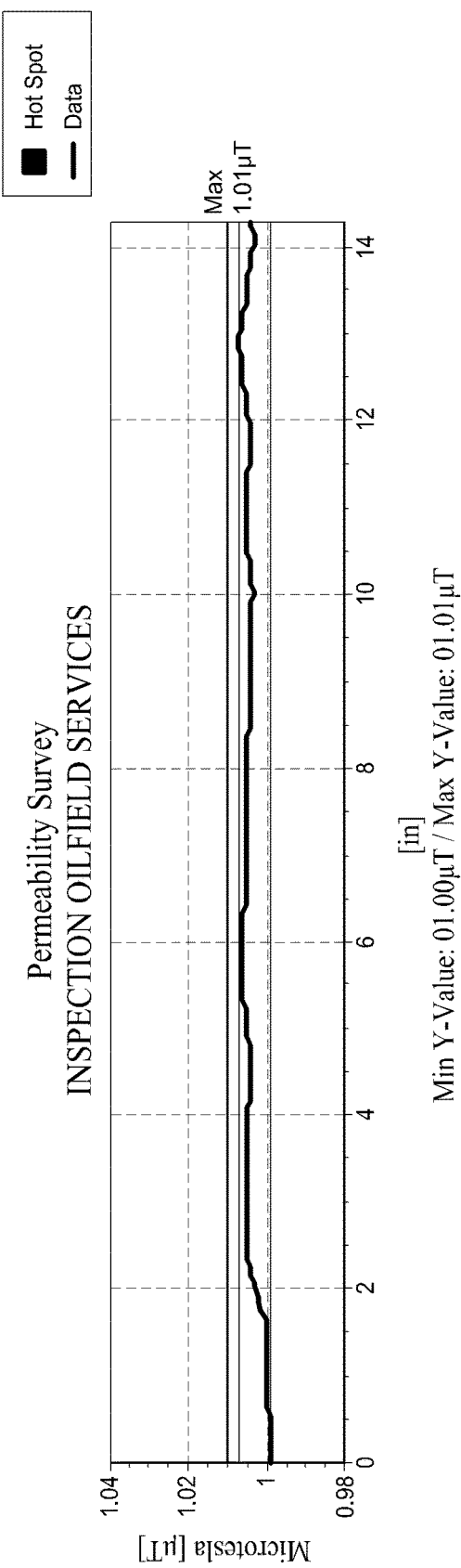
FIG. 2 is a magnetic permeability survey done at an independent testing facility showing the permeability of one embodiment of the present disclosure.

The alloy composition in one embodiment is further characterized has having magnetic permeability values (using a Low-Mu Permeability Tester) of less than 1.02 in one embodiment, less than 1.01 in a second embodiment, and less than 1.005 in a third embodiment. The alloy when applied as hardbanding on drill stem components provides the necessary paramagnetic behavior for the operator to be able to monitor the progress of the bore hole required in directional drillings. In one embodiment, the magnetic permeability was measured at a commercial testing facility and FIG. 2 shows the material survey. The entire survey stayed below the 1.01 maximum.

Figure 3:
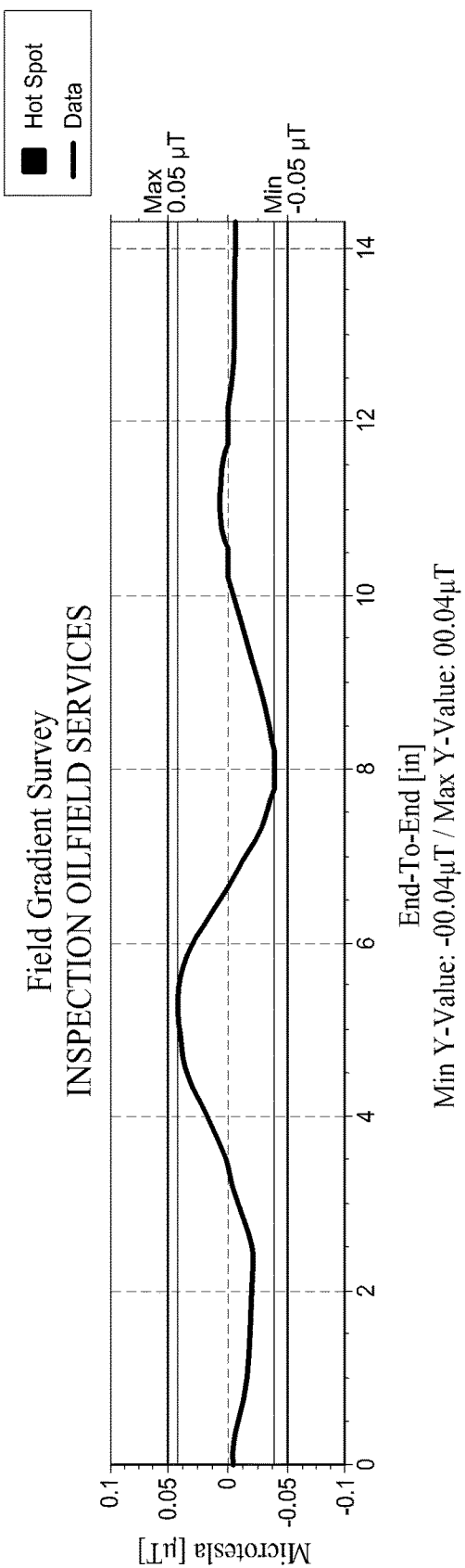
FIG. 3 is a magnetic field gradient survey done at an independent testing facility showing the uniformity of the magnetic field of one embodiment of the present disclosure.

In one embodiment, the commercially measured magnetic field gradient was <0.05 microtesla. No hot spots exceeding the 0.05 microtesla range were found. This indicates a uniform magnetic field as shown in FIG. 3.

When applied as coatings, e.g., hardbanding, for protection of work pieces, the fine-grained microstructural features in the alloy provide durability and prevent wear on secondary "softer" bodies which come into contact with the work piece protected by the coatings. The component protected by the alloy is characterized as having elevated wear resistance with a dry sand abrasion mass loss (ASTM G65-04 procedure A) of less than 0.6 grams in one embodiment; and less than 0.35 grams in a second embodiment.

Applications

The alloy in one embodiment is suitable for use as hardbanding in hard bodies wear applications. In these applications, the material loss in coatings is typically caused by abrasive wear of the harder abrading particles. To reduce the material loss in this process, one should increase the hardness of the coating and/or increasing the amount of comparably hard particles (comparable as related to the abradable particles) or phases within the coating. The alloys contain a sufficient amount of hard particles and display a sufficient hardness property for the protected equipment under these conditions.

The alloys are particularly useful for oil & gas applications, e.g., for work pieces employed in directional drilling operations as coating for drill stem assemblies, exposed outer surface of a bottom hole assembly, coatings for tubing coupled to a bottom hole assembly, coatings for casings, hardbanding on at least a portion of the exposed outer surface of the body, and as coatings for oil and gas well production devices as disclosed in US Patent Publication No. 2011/0042069A1, the disclosure is included herein by reference in its entirety. Examples include devices for use in drilling rig equipment, marine riser systems, tubular goods, wellhead, formation and sandface completions, lift equipment, etc. Specific examples include drillpipe tool joints, drill collars, casings, risers, and drill strings. The coating can be on a least a portion of the inner surface of the work piece, at least a portion of the outer surface, or combinations thereof, preventing wear on the drill collar). The coatings provide protection in operations with wear from vibration (stick-slip and torsional) and abrasion during straight hole or directional drilling, allowing for improved rates of penetration and enable ultra-extended reach drilling with existing equipment.

The coating can be applied as raised ("proud") or flush ("recessed") coating. The coating can be applied on used equipment, e.g., pipe with no previous hardbanding, or to be hardbanded on new work pieces. The coating can be deposited over pre-existing weld deposits and many other previous hard-facing and hard-banding deposits. In one embodiment, the old hardbanding on the equipment is first removed before the application of the alloy.

Besides the use as protective coatings, the alloy lends itself to use in the fabrication of articles of manufacture, including drill collars and housings for containing measurement-while-drilling equipment used in the directional drilling of oil and gas wells. A drill collar is made from a bar, which is trepanned to form an internal bore to desired dimensions. Following trepanning, at least the interior surface is treated so as to place it into compression, for example as by burnishing or peening.

Outside the oil & gas industry, the alloys can also be used as coatings or forming work pieces in many other applications, including but not limited to coatings for fuel cell components, cryogenic applications, and the like, for equipment operating in corrosive environments with non-magnetic requirements.

EXAMPLES

The following examples are intended to be non-limiting.

Example 1

Figure 4:
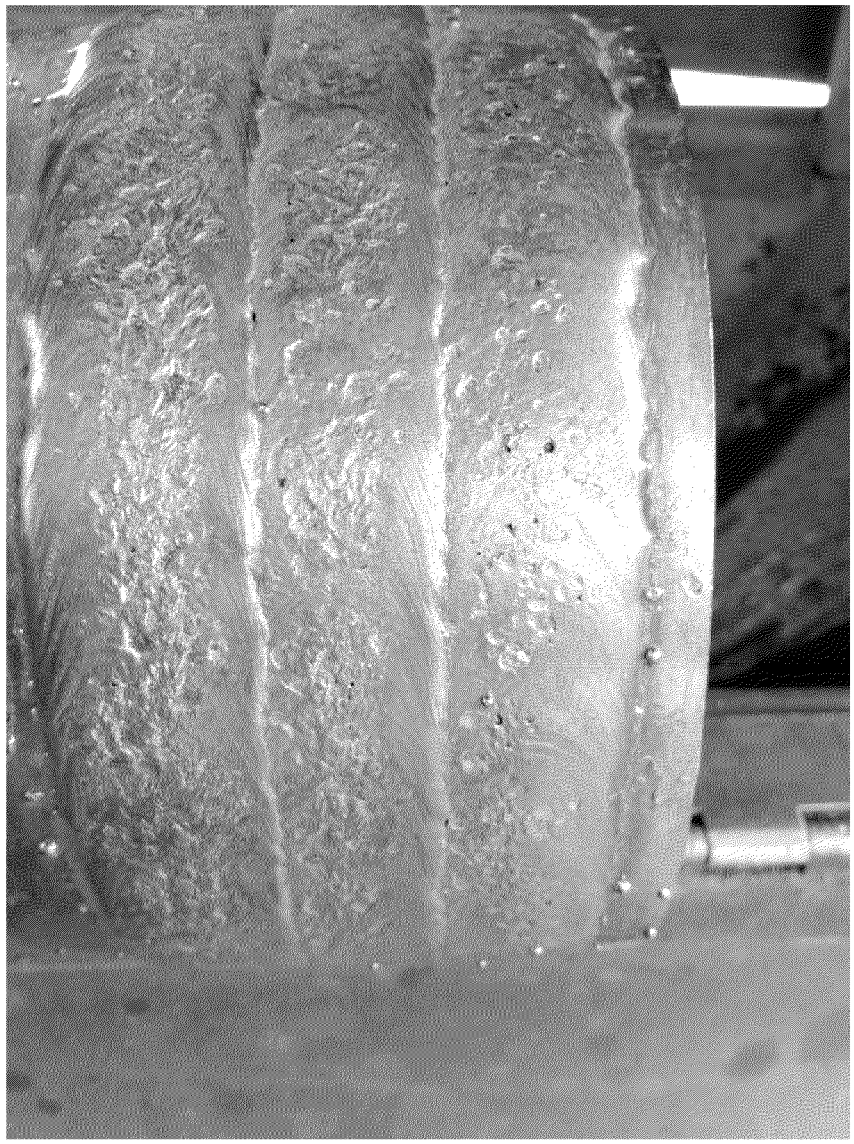
FIG. 4 is a Stainless Steel tool joint welded with an embodiment of the present disclosure with 3 parallel beads.

An alloy composition of Alloy 1 (Mn: 10%, Cr: 5%, Nb: 4%, V: 0.5%, C: 3.5%, W: 5%, Ti: 0.25%, Fe: balance) was produced in the form of a 1/16" cored wire. The alloy was arc-welded onto a 6⅝" outer diameter box Stainless Steel tool joint pre-heated to 450° F. The joint was rotated at a rotation rate of one full rotation every 2 min and 30 sec. The welding parameters are 290 amps, 29.5 volts and a 1" wire stickout. The welding head was moved through the action of an oscillator at a rate of 58 cycle/min, resulting in a weld bead approximately 1" wide and 4/32" thick. Three consecutive beads were made, one next to another to produce three adjacent 1" beads for a total width of roughly 3". The joint was wrapped in insulation to reduce the cooling rate and allowed to cool to room temperature. The as-welded tool joint can be seen in FIG. 4

Figure 5:
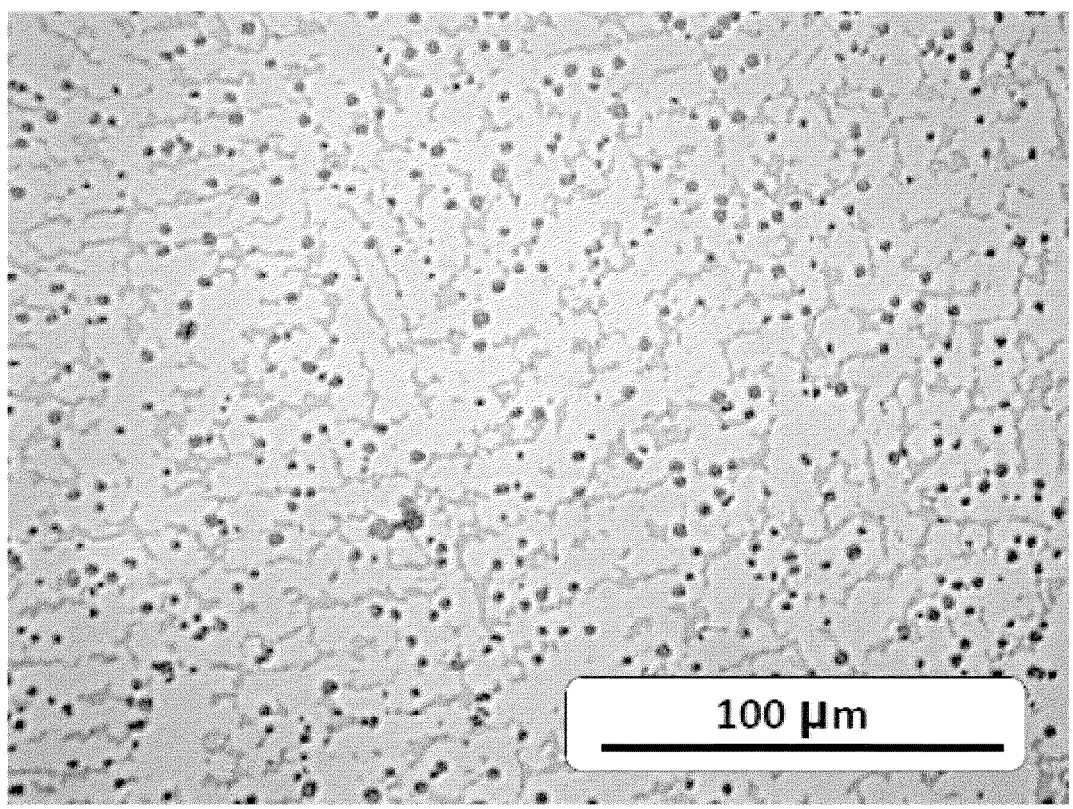
FIG. 5 is the weld bead examined with optical micrographs.

The microstructure of the weld bead was examined with optical micrographs as shown in FIG. 5. A section of a weld was taken and wear tested producing an ASTM G65 wear loss of 0.35 g. Relative magnetic permeability was measured with a probe and provided a value of less than 1.01. Rockwell C hardness was measured at 43.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present disclosure. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the disclosure. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A work piece having at least a portion of its surface covered by a hard layer comprising an austenitic matrix microstructure containing fine-scaled hard boride, carbide, or complex boro-carbide particles;
   wherein the hard layer comprises a macro-hardness in excess of 40 HRC and a relative magnetic permeability less than 1.02; and
   wherein the hard layer comprises an alloy composition in wt. % of Mn: 8-20, Cr: 0-6, Nb: 2-8, V: 0-3, C: 1-6, B: 0-1.5, W: 0-10, Ti: 0-0.5.

2. The work piece of claim 1, wherein the macro-hardness of the hard layer is greater than 50 HRC.

3. The work piece of claim 1, wherein the relative magnetic permeability of the hard layer is less than 1.01.

4. The work piece claim 1, wherein a surface of the of the hard layer exhibits high wear resistance as characterized by an ASTM G65 dry sand wear test mass loss of 0.6 grams or less.

5. The work piece of claim 4, wherein the surface of the hard layer exhibits high wear resistance as characterized by an ASTM G65 dry sand wear test mass loss of 0.35 grams or less.

6. The work piece of claim 1, wherein the austenitic matrix contains fine-scaled hard boride, carbide, or complex boro-carbide particles up to 50 vol. % with average sizes between 100 nm-20 μm.

7. The work piece of claim 6, wherein the austenitic matrix contains fine-scaled hard boride, carbide, or complex boro-carbide particles up to 30 vol. % with average sizes between 1-5 μm.

8. The work piece of claim 1, wherein the alloy composition is selected from group consisting of:
   Fe: bal, Mn: 10, Cr: 5, Nb: 4, V: 0.5, C: 4, W: 5, Ti: 0.25;
   Fe: bal, Mn: 10, Cr: 5, Nb: 4, V: 0.5, C: 3.5, W: 5, Ti: 0.20;
   Fe: bal, Mn: 16, Cr: 5, Nb: 4, V: 0.5, C: 3.25, W: 5, Ti: 0.20;
   Fe: bal, Mn: 10, Cr: 5, Nb: 4, V: 0.5, C: 3, W: 5, Ti: 0.20;
   and combinations thereof.

9. The work piece of claim 1, wherein the hard layer does not contain preformed carbides.

10. The work piece of claim 1, where the hard layer is used as a hardfacing layer configured to protect oilfield components used in directional drilling applications against abrasive wear.

* * * * *